United States Patent [19]

Pattock

[11] Patent Number: 5,065,604
[45] Date of Patent: Nov. 19, 1991

[54] IGNITION INTERLOCK SYSTEM
[75] Inventor: Greg R. Pattock, Spring Lake, Mich.
[73] Assignee: Sparton Corporation, Jackson, Mich.
[21] Appl. No.: 535,763
[22] Filed: Jun. 11, 1990
[51] Int. Cl.$^5$ .................................. B60R 25/00
[52] U.S. Cl. ................................ 70/239; 248/252
[58] Field of Search ............... 70/239, 252, 185, 186, 70/248, 247; 74/475, 878

[56] References Cited

U.S. PATENT DOCUMENTS

| | | | |
|---|---|---|---|
| 3,827,526 | 8/1974 | Smith | 180/114 |
| 4,232,538 | 11/1980 | Detloff, Jr. | 70/239 |
| 4,232,571 | 11/1980 | Kimberlin | 74/878 |
| 4,235,123 | 11/1980 | Simancik | 74/475 |
| 4,270,624 | 6/1981 | Jessop | 180/287 |
| 4,520,640 | 6/1985 | Kramer | 70/248 |
| 4,596,303 | 6/1986 | Tremblay | 180/287 |
| 4,884,423 | 12/1989 | Fancher | 70/248 |
| 4,936,158 | 6/1990 | Livshits et al. | 74/475 |
| 4,959,982 | 10/1990 | Mauz | 70/248 |
| 4,967,889 | 11/1990 | Kito | 192/4 A |
| 4,982,584 | 1/1991 | Takeda | 70/252 |

Primary Examiner—Robert L. Wolfe
Attorney, Agent, or Firm—Reising, Ethington, Barnard, Perry & Milton

[57] ABSTRACT

The ignition interlock system prevents movement of the ignition switch of a motor vehicle from the "Off" position to the "Lock" position unless the transmission selector is in the "Park" position. The ignition interlock system includes a locking lever spring biased to lock the reciprocable slide of the ignition switch mechanism when the transmission selector is not in the "Park" position. The locking lever is unlocked from the reciprocable slide by energization of a solenoid in response to the transmission selector being placed in the "Park" position with the ignition key inserted in the ignition switch. A control circuit energizes or deenergizes the solenoid in response to input signals representing the transmission selector position and the ignition key in/out position.

11 Claims, 4 Drawing Sheets

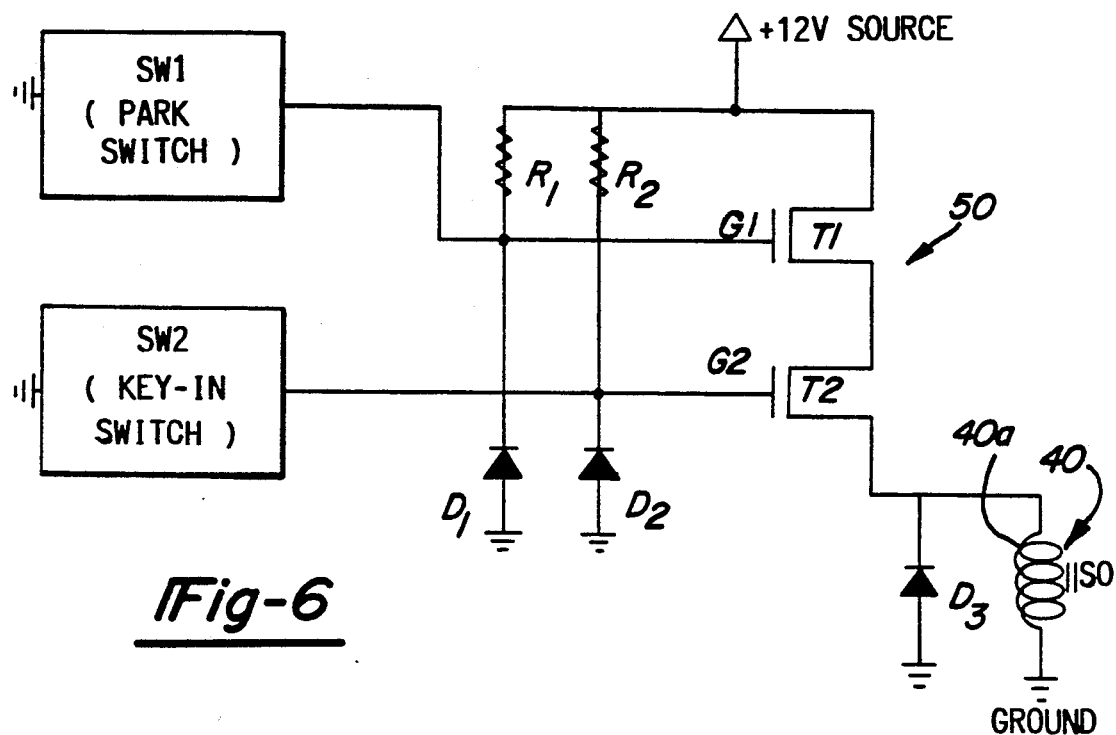
Fig-6
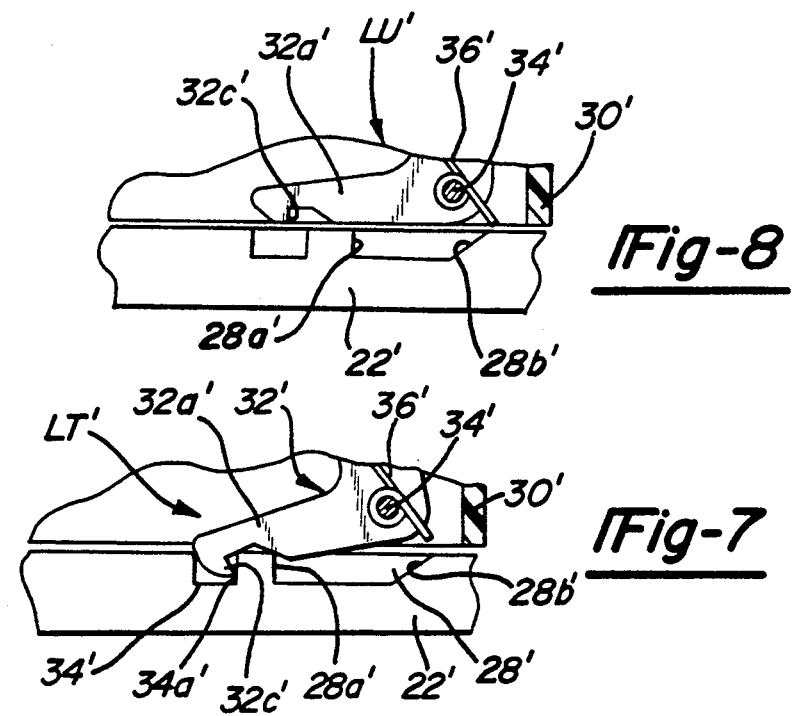
Fig-8
Fig-7

5,065,604

IGNITION INTERLOCK SYSTEM

FIELD OF THE INVENTION

The present invention relates to an interlock system for a vehicle ignition switch mechanism.

BACKGROUND OF THE INVENTION

Interlock systems are known for use in connection with steering column-mounted ignition switch mechanisms for preventing the ignition lock from being placed in the "Lock" position unless the transmission shift selector has been moved to the "Park" position. For example, U.S. Pat. No. 4,520,640 describes a mechanical interlock system including a slidable ignition pin, a transmission selector pin and a latch ball therebetween to prevent actuation of the ignition switch to the "Lock" position unless the transmission selector has been moved to the "Park" position.

U.S. Pat. No. 4,232,538 also discloses a mechanical interlock system for carrying out the same interlocking function.

One particular mechanical ignition interlock system includes a pivotable locking lever operably connected to the transmission selector via a cable. When the transmission selector is not in the "Park" position, the cable positions the locking lever in a recess of an ignition slide to prevent movement of the ignition switch from the "Off" position to the "Lock" position. When the transmission selector is finally moved to the "Park" position, the cable pivots the locking lever out of the recess to free the ignition slide and thus the ignition switch for movement from the "Off" position to the "Lock" position.

Interlock systems are also known for use in connection with the ignition switch and the transmission selector to prevent shifting of the transmission selector from the "Park" position until the ignition switch has been moved from the "Lock" position to the "Start" or "Run" position. Copending U.S. application Ser. Nos. 137,759, now U.S. Pat. No. 4,936,158, and 314,717, now U.S. Pat. No. 5,018,610, of common assignee herewith disclose interlock systems of the mechanical and electromechanical type to carry out this interlock function between the ignition switch and the transmission selector.

It is an object of the invention to provide an improved ignition interlock mechanism for a motor vehicle to prevent movement of the ignition switch from the "Off" position to the "Lock" position unless the transmission selector has been moved to the "Park" position.

It is another object of the invention to provide an improved electromechanical ignition interlock mechanism which eliminates the need for a cable to actuate the locking lever.

It is another object of the invention to provide an improved electromechanical ignition interlock mechanism which is responsive to certain input signals representative of the status of the transmission selector and the ignition key in/out.

It is still another object of the invention to provide an improved electromechanical ignition interlock mechanism which is low in cost and reliable in operation without interfering with operation of existing components of the vehicle.

SUMMARY OF THE INVENTION

The present invention contemplates an ignition interlock mechanism for a motor vehicle having an ignition switch mechanism movable (e.g., rotatable) by the vehicle operator to "Start", "Run", "Off" and "Lock" positions and a transmission selector movable from a drive position to a "Park" position.

The ignition interlock system of the invention includes a reciprocable actuator member, such as an actuator slide, that is moved in response to rotation of the ignition switch mechanism to actuate an electrical switch device connected to the vehicle electrical system to operative positions corresponding to the "Start", "Run", "Off" and "Lock" positions. A locking member is disposed proximate a stop surface on the reciprocable actuator member and is movable to a locking position relative to the stop surface to prevent movement of the reciprocable member and to an unlocking position relative to the stop surface to free the reciprocable member and thus the ignition switch mechanism for movement.

Preferably, the locking member comprises a pivotal locking lever having one arm proximate the stop surface of the reciprocable member for movement between the locking and unlocking positions, a second actuated arm and a pivot axis between the first and second arms. A coil spring disposed about the pivot axis biases the lever in a direction to position the first arm in the locking position relative to the stop surface.

An electrical actuator is disposed proximate the locking member and, when energized, moves the locking member to the unlocking position to free the reciprocable member for movement. Preferably, the electrical actuator comprises a solenoid whose plunger engages the second arm of the pivotal locking lever described above to so pivot it as to move the first arm to the unlocking position.

The electrical actuator is energized or deenergized by a control circuit. In particular, the control circuit is operable in response to the transmission selector being in the "Park" position to energize the solenoid and thereby move the locking member to the unlocking position relative to stop surface of the reciprocable member. The latter is then freed for movement in response to rotation of the ignition switch mechanism from the "Off" position to the "Lock" position. However, when the transmission selector is in a drive position, the control circuit solenoid is deenergized such the locking member is spring biased to the locking position to prevent movement of the reciprocable member and thus the ignition switch mechanism from the "Off" position to the "Lock" position.

Once the transmission selector is in the "Park" position and the ignition switch mechanism is in the "Lock" position, the control circuit deenergizes the solenoid upon removal of the ignition key. Deenergization of the solenoid allows the spring bias on the locking member to place it in a rest position relative to the reciprocable member. The rest position does not interfere or prevent subsequent movement of the ignition switch mechanism from the "Lock" to the "Off" position when the ignition key is again inserted in the ignition switch mechanism.

Once the ignition key is again inserted with the transmission selector in "Park" position, the control circuit energizes the solenoid to move the locking member to the unlocking position.

In one embodiment of the invention, the control circuit includes a transmission selector responsive switching means and an ignition key-in responsive switching means in series with one another and with the solenoid such that an electrical path from 12 volts to ground is applied through the coil of the solenoid to energize it when the transmission selector is in the "Park" position and the ignition key is in an inserted position. The control circuit deenerqizes the solenoid under all other conditions of the transmission selector, ignition switch mechanism and ignition key.

The present invention also contemplates an ignition interlock mechanism of the type described hereinabove wherein the reciprocable member includes a theft-deterrent surface in addition to the stop surface. The theft-deterrent surface is adapted to be lockingly engaged by the locking member when the transmission selector is in the "Park" position, the ignition switch mechanism is in the "Lock" position and the ignition key is removed. This provides a theft-deterrent to hinder forcible movement of the reciprocable member and thus the ignition switch mechanism from the "Lock" position to the "Off" position until the ignition key is inserted in the ignition switch mechanism.

These aforementioned objects and advantages of the invention will become more readily apparent in view of the following detailed description taken with the following drawings.

BRIEF DESCRIPTION OF THE DRAWINGS

FIG. 6 is a diagrammatic of the electrical control circuit.

FIG. 7, is an enlarged sectioned elevational view of another embodiment of the ignition interlock mechanism wherein the locking lever is shown in the theft-deterrent position when the transmission selector is in the "Park" position and the ignition switch in the "Lock" position with ignition key removed.

FIG. 8 is similar to FIG. 7 wherein the locking lever is shown in the unlocking position when the transmission selector is in the "Park" position and the ignition switch is in the "Lock" position with the ignition key inserted.

DETAILED DESCRIPTION OF THE INVENTION

Figure 1:
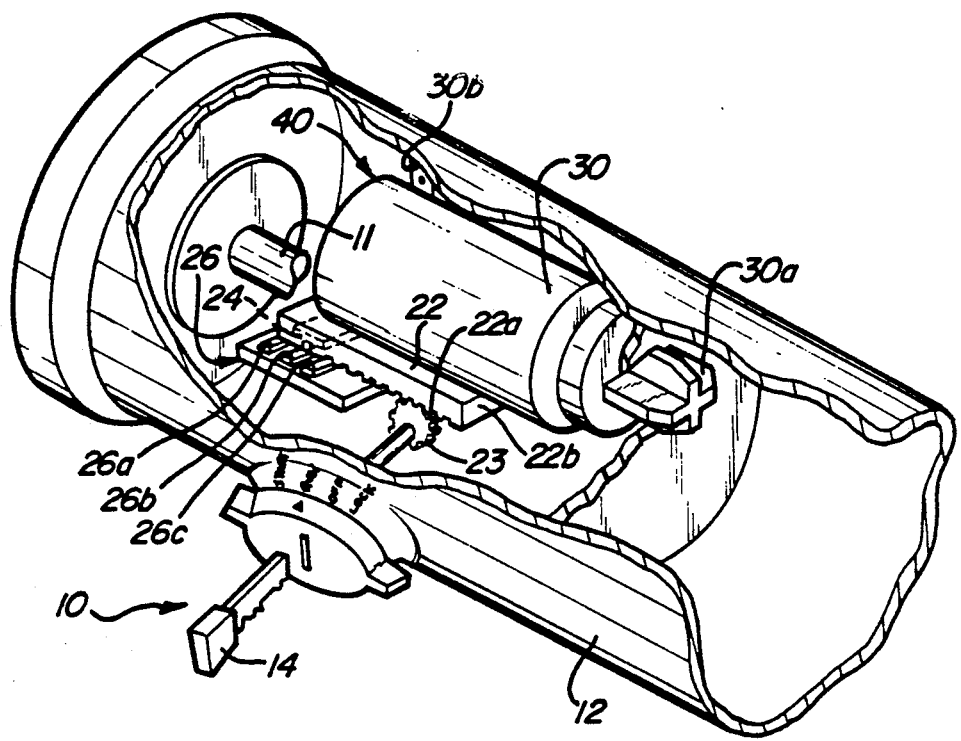
FIG. 1 is a schematic perspective view of a steering column of a motor vehicle showing the ignition interlock system thereon.

Referring to FIG. 1, the ignition interlock mechanism is adapted for use on a motor vehicle having a conventional ignition switch mechanism 10 and steering shaft 11 on a steering column 12. The ignition switch mechanism 10 is movable, typically rotatable, by a vehicle operator to "Lock", "Off", "Start" or "Run" positions. For example, to start the vehicle, the vehicle operator inserts the ignition key 14 in the ignition switch mechanism 10 and rotates the key to move the ignition switch mechanism 10 from the "Lock" position to the "Off" position and then to the "Start" position to start the motor. Upon starting of the motor, the operator releases the ignition key which is returned by spring bias to the "Run" position. To stop the vehicle motor, the operator rotates the ignition key 14 to the "Off" position.

The ignition switch mechanism 10 includes a reciprocable actuator member 22, such as the actuator slide, shown in FIGS. 2-5, that is moved (slides) in response to rotation of the ignition switch mechanism 10. Typically, the actuator member 22 includes a toothed rack portion 22a adjacent one end in mesh with a toothed pinion 23 that is rotated by rotation of the ignition switch mechanism 10, e.g., see U.S. Pat. No. 4,232,538 and 4,596,303 which show such a rack and pinion arrangement for translating an actuator slide in response to rotation of the ignition switch mechanism 10. Of course, other driving arrangements can be employed to move the actuator member 22 in response to movement of the ignition switch mechanism 10.

Typically, the actuator member or slide 22 includes an electrical contact 24 that cooperates with electrical contacts 26a, 26b, 26c, etc. of an electrical switch unit 26 (shown in FIG. 2) of the vehicle electrical system to actuate the unit 26 to the "Lock", "Off", "Start", "Run" positions, all as is well known. Alternately, the actuator member or slide 22 can be connected to an actuator rod (not shown) that, in turn, controls an electrical switch unit of the vehicle electrical system, e.g., see U.S. Pat. No. 3,829,526. Of course, the actuator member 22 can be coupled in still other ways to the switch unit of the vehicle electrical system.

Referring to FIGS. 1-5, the ignition interlock mechanism is shown including a housing 30, a locking member or lever 32 pivotally mounted on the housing 30 by pivot pin 34 and a biasing spring 36 disposed about the pivot pin 34. In particular, one end of the housing 30 includes a longitudinal nose 30a that is received in an appropriately configured wall passage in the steering column structure. The other end of the housing 30 includes a flange 30b that is fastened to the steering column structure. The housing 30 is mounted so that an open housing side 30d is located adjacent the recessed side 22c of the actuator member or slide 22 to permit the recessed side 22c to slide back and forth relative to the locking member 32 in response to rotation of the ignition switch mechanism 10. The pivot pin 34 and thus the pivot axis of the locking member or lever 32 is perpendicular to the direction of sliding movement of the actuator member or slide 22.

The recessed side 22c includes an axially elongate recess 28 defined between a first end wall 28a constituting a stop surface for purposes to be explained hereinbelow and a second longitudinally spaced, inclined end wall 28b.

The locking member 32 preferably is in the form of a locking lever having a first elongate arm 32a movable between locking and unlocking positions relative to the stop surface 28a and a second elongate arm 32b disposed in proximity to the plunger 38 of an electrical actuator 40 (e.g., a solenoid) for actuation by the plunger 38. In particular, when the electrical actuator 40 is energized, the plunger 38 is extended to position second arm 32b in the position shown in FIG. 2 and thereby position the locking lever 32 (namely, first arm 32a) in an unlocking position LU relative to the stop surface 28a. When the electrical actuator 40 is deenergized, the plunger 38 is in the retracted position shown in FIG. 3 such that the spring 36 biases the second arm 32b against the retracted plunger 38 whereby the locking lever 32 (namely; first arm 32a) is positioned in recess 28 in a locking position LL relative to the stop surface 28a. To this end, the spring 36 includes one end 36a connected to the second arm 32b and another end 36b connected to the housing 30 so as to bias the locking member or lever 32 counterclockwise in FIGS. 2-5. The plunger 38 may include a clip (not shown) thereon to set its retracted position.

Energization or deenergization of the coil 40a of the electrical actuator 40 (i.e. solenoid) is effected by a control circuit 50 shown in FIG. 6. In particular, the control circuit 50 energizes the solenoid coil 40a by applying a path from the vehicle 12 volt D.C. source shown (e.g., electrical system and battery of the vehicle) to ground through insulated gate switching transistors T1, T2 and the solenoid coil 40a when the transistors T1, T2 are both rendered current conducting. On the other hand, one or both of transistors T1, T2 can be rendered current non-conducting to deenergize the coil 40a. In effect, the transistors T1, T2 constitute first and second switching means connected in series with the solenoid coil 40a and with one another.

The transistor T1 is rendered current conducting when the transmission selector 20 (FIGS. 2—5) is in the "Park" position and is current non-conducting when the transmission selector is in a drive position, such as "Reverse" or "Drive", or in a neutral position. In particular, the gate G1 of transistor T1 is pulled up by pull-up resistor R1 to a high voltage state that renders the transistor T1 current non-conducting when the transmission selector 20 is in a position other than the "Park" position. However, when the transmission selector 20 is placed in the "Park" position, a "Park" switch SW1 (shown schematically) is actuated (e.g., closed) so as to apply a path to ground to the gate G1 and thereby place the gate G1 at a lower voltage state (below a selected threshold voltage) to render the transistor T1 current conducting. The "Park" switch SW1 functions to monitor whether or not the transmission selector 20 is at the "Park" position.

The transistor T2 is rendered current conducting when the ignition key 14 is inserted in the ignition switch mechanism 10 and current non-conducting when the key is removed from the ignition switch mechanism. In particular, the gate G2 of transistor T2 is pulled up by pull-up resistor R2 to a high voltage, current nonconducting state when the ignition key 14 is removed from the ignition switch mechanism 10. However, when the ignition key is inserted in the ignition switch mechanism, a KEY-IN switch SW2 (shown schematically) is actuated (e.g., closed) so as to apply a path to ground to the gate G2 and thereby place the gate G2 at a lower voltage state (below a selected threshold voltage) to render the transistor T2 current conducting. The KEY-IN switch SW2 is of the type currently used in automobile ignition switch mechanisms to determine when the ignition key is inserted therein (e.g., to actuate a driver alert sound device indicating the key is in the ignition switch).

As a result, solenoid 40 is only energized if the ignition key 14 is inserted in the ignition switch mechanism and the transmission selector 20 is in the "Park" position. The solenoid coil 40a is deenergized under all other conditions of the ignition switch mechanism 10, the ignition key 14 and the transmission selector 20.

Diodes D1, D2, D3 provide protection against back EMF generated in the control circuit 50.

Figure 2:
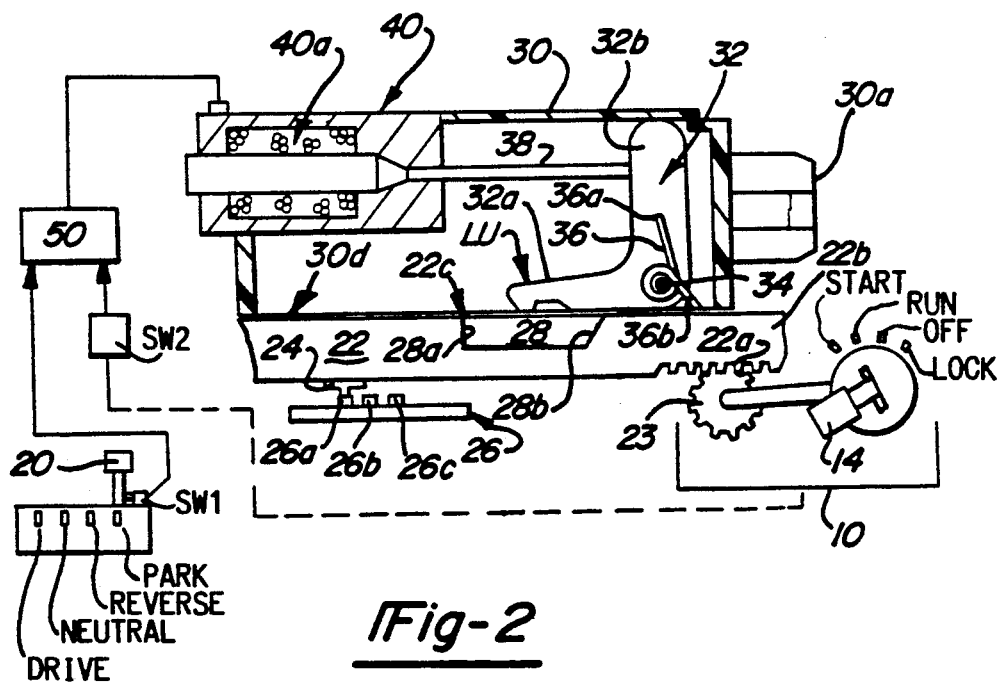
FIG. 2 is a sectioned elevational view of an ignition interlock mechanism in accordance with the invention wherein the locking lever is shown in the unlocking position with the transmission selector in a non-drive position (i.e., "Park" position) and the ignition switch in the "Run" or "Start" position with the ignition key inserted.

FIG. 2 illustrates the locking member or lever 32 in the unlocking position relative to the stop surface 28a of the actuator member 22 when the transmission selector 20 is in a non-drive position (i.e., "Park") and the ignition switch mechanism 10 is in the "Run" position (ignition key is inserted).

Figure 3:
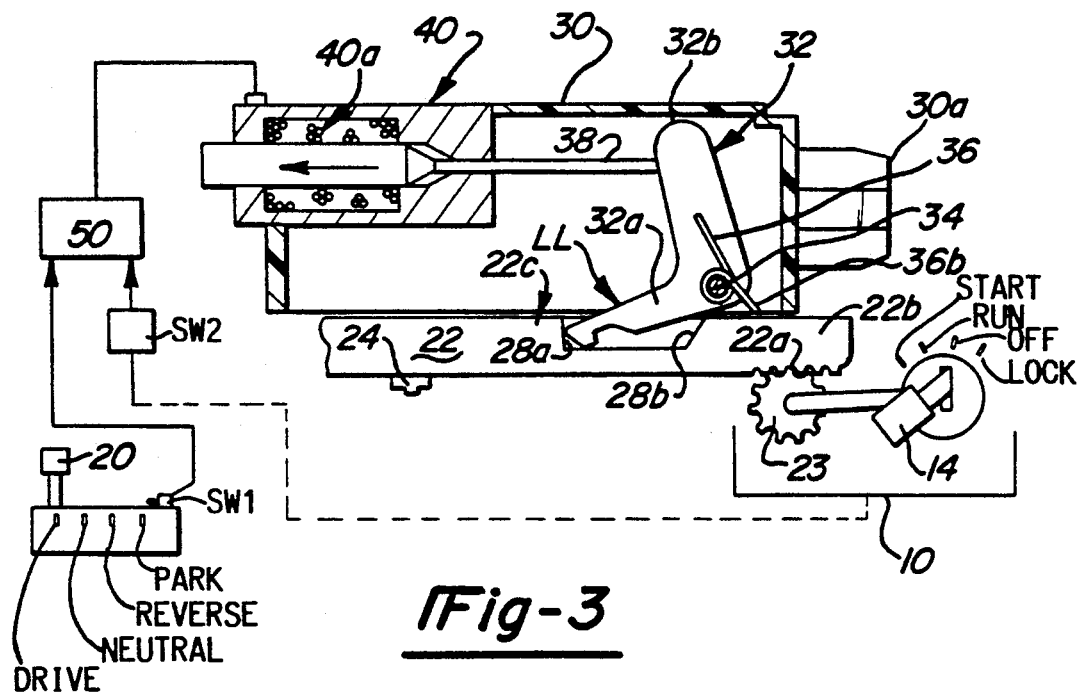
FIG. 3 is similar to FIG. 2 wherein the locking lever is shown in the locking position with the transmission selector in the drive position and the ignition switch in the "Off" position with the ignition key inserted.

FIG. 3 illustrates the transmission selector 20 in the "Drive" position and the ignition switch mechanism 10 in the "Off" position (ignition key is inserted). This situation could exist after the operator stops the vehicle and is ready to park it. However, the operator inadvertently might not have moved the transmission selector 20 from the drive position (e.g., "Reverse" or "Drive") to the "Park" position as required to park the vehicle. If the transmission selector 20 has not been moved to the "Park" position (e.g., selector 20 is still in the "Drive" position of FIG. 3), the control circuit 50 will prevent energization of the solenoid coil 40a (transistor T1 will be non-conducting). The first arm 32a of the locking member 32 will be in the locking position LL relative to the stop surface 28a by virtue of the bias of spring 36. As a result, if the operator attempts to rotate the ignition switch mechanism 10 from the "Off" position to the "Lock" position (e.g., attempting to cause a left to right movement of the slide 22 in FIG. 3), the first arm 32a of the locking member will prevent such movement as a result of being in the locking position relative to the stop surface 28a.

Figure 4:
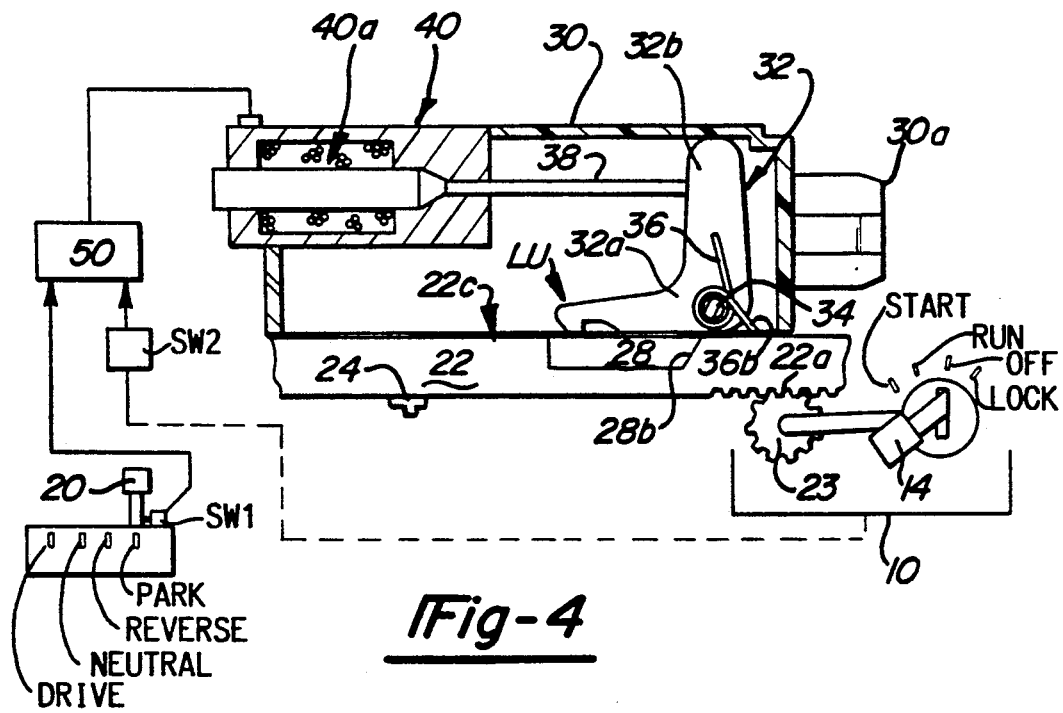
FIG. 4 is similar to FIG. 2 wherein the locking lever is shown in the unlocking position with the transmission selector in the "Park" position and the ignition switch in the "Off" position with the ignition key inserted.

However, once the operator places the transmission selector 20 in the "Park" position with the ignition key 14 still inserted in the ignition switch mechanism in the "Off" position, the solenoid coil 40a will be energized to extend plunger 38 and move the locking member 32 to the unlocking position LU, FIG. 4, thereby freeing actuator member 22 and thus the ignition switch mechanism 10 for movement. As a result, the operator can now turn the ignition switch mechanism 10 from the "Off" position to the "Lock" position where the steering wheel is locked in position. The ignition key 14 can then be removed, FIG. 5.

Figure 5:
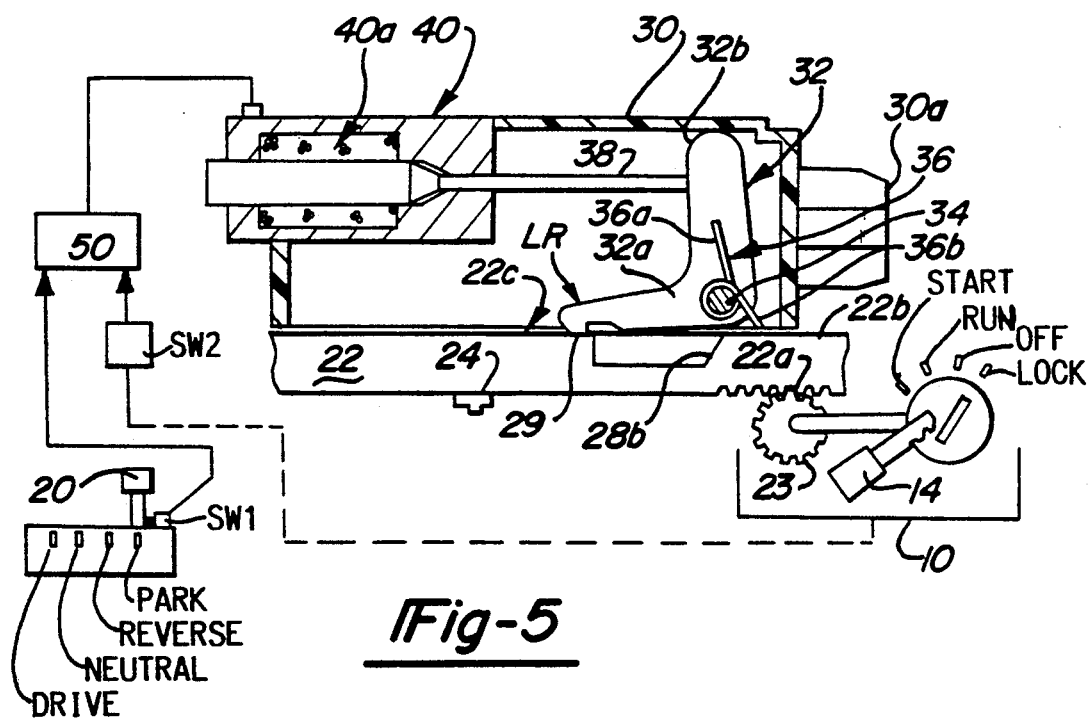
FIG. 5 is similar to FIG. 2 wherein the locking lever is shown in the rest position with the transmission selector in the "Park" position and the ignition switch in the "Lock" position with the ignition key removed.

Rotation of the ignition switch mechanism 10 from the "Off" position to the "Lock" position effects linear left-to-right movement of the actuator member 22 to the position shown in FIG. 5 where the recess 28 is moved past the end of first arm 32a. Removal of the ignition key 14 from the ignition switch mechanism 10 at this point in time will effect deenergization of the solenoid coil 40a so that there is no battery drain. As a result, spring 36 will bias the locking member 32 so that the first arm 32a is in a rest position LR on the flat surface 29 adjacent recess 28 of the actuator slide 22, FIG. 5.

When the operator wants to restart the vehicle, the ignition key 14 is inserted in the ignition switch mechanism 10 and the latter is rotated from the "Lock" position to the "Off" position. Rotation of the ignition switch mechanism 10 to the "Start" position and then "Run" position is then possible. After the key 14 is inserted and the mechanism 10 is in the "Off" position, the locking lever 32 is in the unlocking position of FIG. 4 as a result of energization of solenoid coil 40a (i.e., ignition key is inserted and shift lever is in "Park"). Upon rotation of the ignition switch mechanism 10 from the "Off" position to the "Start" position or the "Run" position, FIG. 2, the actuator slide 22 is moved to the left (as compared to its position when the ignition switch mechanism 10 is in the "Off" position).

Once the transmission selector 20 is moved from the "Park" position with the ignition switch mechanism 10 in the "Run" position, the solenoid coil 40a is deenergized, causing the first arm 32a of the locking member 32 to be biased (by spring 36) in the recess 28 of the repositioned actuator member 22.

Referring to FIGS. 7-8, another embodiment of the invention is illustrated wherein like features of FIGS. 2-5 are represented by like reference numerals primed. This embodiment differs from that of FIGS. 2-5 in providing a second recess 34' longitudinally spaced from the first recess 28' on the actuator member or slide 22'. In particular, the second recess 34' includes an end wall 34a' that functions as a theft-deterrent surface (stop surface) when the transmission selector is in the "Park" position, the ignition switch mechanism is in the "Lock" position and the ignition key is removed.

In particular, when the transmission selector is placed in the "Park" position and the ignition switch mechanism is moved from the "Off" position to the "Lock" position with the ignition key remaining in the ignition switch mechanism, the locking lever 32' is in the unlocking position of FIG. 8 by virtue of the control circuit 50 described above energizing the electrical actuator 40. However, once the "Lock" position of the ignition switch mechanism is reached and the ignition key is removed, the electrical actuator 40 is deenergized such that spring 36' biases the first arm 32a' of the locking lever 32' to the theft-deterrent position LT' shown in FIG. 7 where theft-deterrent surface 32c' of the first arm 32a' is so engaged with the theft-deterrent surface 34a' that the actuator member 22' cannot be moved from the "Lock" position until the ignition key is inserted. Once the ignition key is inserted in the ignition switch mechanism, the electrical actuator 40 is energized to move the locking lever 32' to the unlocking position LU' and thus allow movement of the ignition switch mechanism from the "Lock" position to the "Off" position.

In other respects, the theft-deterrent embodiment of the invention just described functions in the same manner and includes the same components as described hereinabove with respect to FIGS. 2-6.

While the invention has been described in terms of specific embodiments thereof, it is not intended to be limited thereto but rather only to the extent set forth hereafter in the following claims.

I claim:

1. An ignition interlocking mechanism for use on a vehicle, comprising:
   (a) an ignition switch mechanism movable by an operator to "Run", "Off" and "Lock" positions, said ignition switch mechanism including a reciprocable member movable in response to movement of the ignition switch mechanism, said reciprocable member having a stop surface thereon,
   (b) a transmission selector movable between a drive position and a "Park" position,
   (c) a locking member disposed proximate the reciprocable member for movement to a locking position relative to the stop surface to prevent movement of said reciprocable member or to an unlocking position relative to the stop surface to free said reciprocable member for movement in response to movement of said ignition switch mechanism,
   (d) an electrical actuator energizable to move the locking member from the locking position to the unlocking position,
   (e) means for moving the locking member to the locking position when the electrical actuator is deenergized, and
   (f) a control circuit operable in response to the transmission selector being in the "Park" position to energize said electrical actuator and in response to the transmission selector being in the drive position to deenergize said electrical actuator when the ignition switch mechanism is in the "Off" position such that movement of the ignition switch mechanism from the "Off" position to the "Lock" position is prevented unless the transmission selector is in the "Park" position.

2. The interlock mechanism of claim 1 wherein the reciprocable member comprises an actuator slide for controlling a switch unit connected to the vehicle electrical system.

3. The interlock mechanism of claim 2 wherein the stop surface comprises an end wall of a recess in said actuator slide.

4. The interlock mechanism of claim 1 wherein the locking member comprises a locking lever having a first arm for movement between the locking position and unlocking position relative to the stop surface, a second arm disposed proximate the electrical actuator for actuation thereby and a pivot between the first arm and the second arm.

5. The interlock mechanism of claim 4 wherein the means for moving the locking member comprises a spring disposed about the pivot and so engaging said second arm as to bias the first arm to the locking position when the electrical actuator is deenergized.

6. The interlock mechanism of claim 1 wherein the electrical actuator comprises a solenoid having a plunger for actuating the locking member when the plunger is extended.

7. The interlock mechanism of claim 1 wherein the control circuit includes a first switching means in series with the electrical actuator, said first switching means being current conducting when the transmission selector is in the "Park" position and non-conducting when the transmission selector is in the drive position.

8. The interlock mechanism of claim 7 where the control circuit further includes a second switching means in series with the electrical actuator and the first switching means, said second switching means being current conducting when an ignition key is inserted in the ignition switch mechanism and non-conducting when the ignition key is removed from the ignition switch mechanism.

9. The interlock mechanism of claim 8 wherein the reciprocable member further includes a theft-deterrent surface so located as to be lockingly engaged by the locking member when the transmission selector is in the "Park" position and the ignition switch mechanism is in the "Lock" position to prevent movement of the reciprocable member and thus of the ignition switch mechanism from the "Lock" position to the "Off" position until the ignition key is inserted in the ignition switch mechanism.

10. The interlock mechanism of claim 9 wherein said stop surface comprises an end wall of a first recess in the locking member and said theft-deterrent surface comprises and end wall of a second recess in the locking member, said first recess being longitudinally adjacent said second recess.

11. The interlock mechanism of claim 8 wherein the first switching means and second switching means are each insulated gate transistors with respective gates pulled up to a selected voltage when the first switching means and second switching means are current non-conducting.

* * * * *